United States Patent Office 2,711,829
Patented June 28, 1955

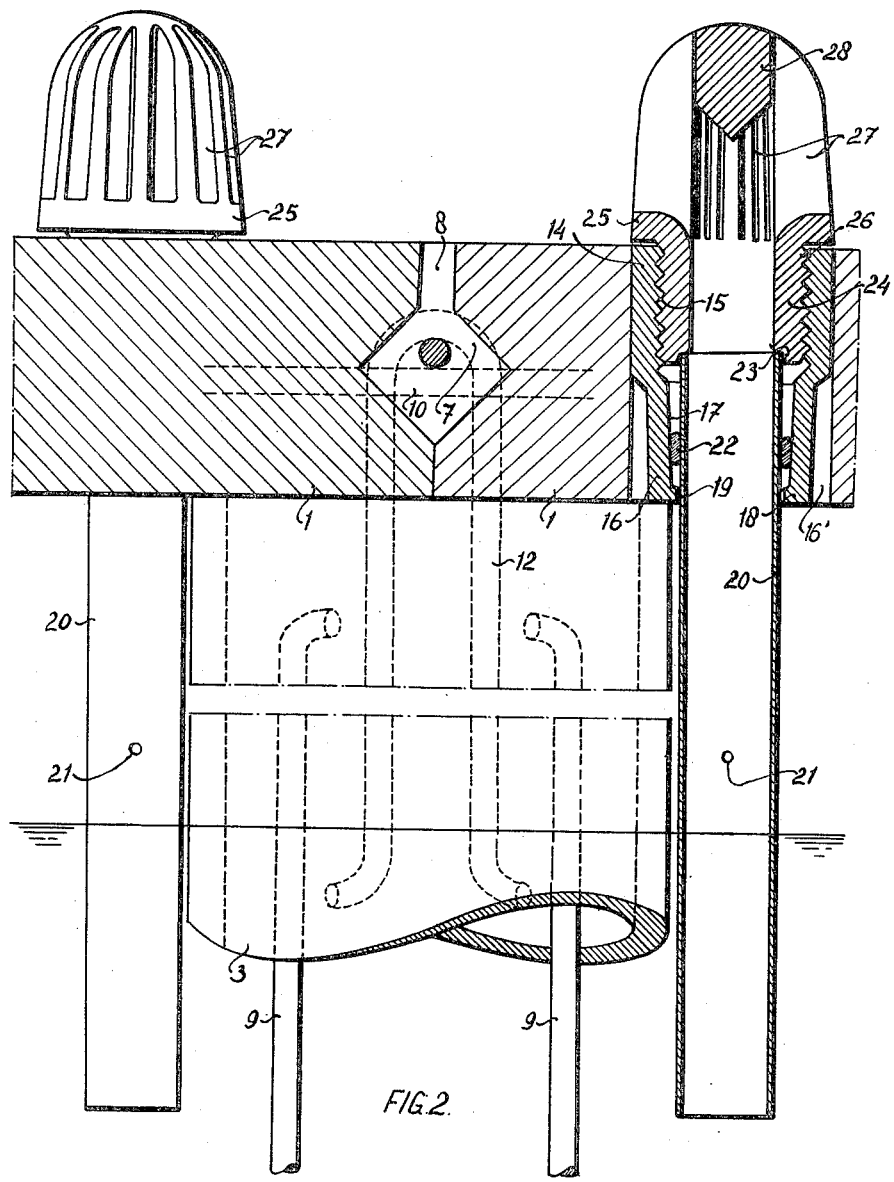

2,711,829

LIQUID PURIFYING FILTERS

Cornelis Wichert Hulsbergen, The Hague, Netherlands

Application October 25, 1950, Serial No. 192,027

Claims priority, application Netherlands October 25, 1949

4 Claims. (Cl. 210—171)

The present invention relates to the construction of liquid purifying filters for instance for use in treating large quantities of water in central drinking water supply systems.

In such filters, the active element is formed by a bed of granular material, such as sifted river sand, confined in a container of reinforced concrete or the like substance.

In use this filter-bed is traversed by the liquid to be treated, in downward direction, the purified liquid being drained by suitable draining means arranged in said filter-bed, whilst the substances separated from the liquid are left behind on or in said filter-bed to be periodically washed or removed therefrom, generally by passing through said filter-bed, in upward direction a strong flow of water. To reduce the time required for effectively flushing the filter material, frequently air is introduced from below into the filter-bed, either simultaneously or alternately with the water flow.

In filters of this kind it has been proposed in order to ensure a uniform flow of the liquid through the filter-bed during this flushing operation as is necessary for a permanently satisfactory performance of the plant, to provide below the filter-bed a false bottom or floor of non-porous material, having arranged therein a plurality of uniformly distributed flushnozzles.

According to a known structure of this kind this false bottom or floor is constituted by a number of rectangular reinforced concrete slabs supported at their small sides on beams or arches. Internally screw threaded sleeves are embedded in said slabs and nozzles are screwed in the sleeves from above. So called plunge tubes are mounted in said sleeves beneath the nozzles to extend through said respective slabs into the space below the floor, said tubes being provided at their upper end with a flange engaging with intercallation of a packing washer, an internal shoulder of the respective sleeve to be locked in place by the nozzle screwed into the upper end of said sleeve. At their free end such plunge tubes are provided with axially extending saw cuts of a length of about 5 to 10 cm.

In practice, when flushing the filter-bed, water and air are introduced into the space beneath the slabs, the air accumulating above the water level and building up an air cushion increasing in height, until the water level is lowered to beneath the upper edge of the saw cuts in said plunge tubes thereby enabling the air under pressure, possibly together with water, to enter into the filter-bed via the tubes and the nozzles.

The present invention has for its object certain new and useful improvements of this known system, both as concerns its performance and the economy of its construction.

An important feature of my invention consists in an improved manner of mounting the plunge tubes so as to enable individual adjustment of said tubes in vertical direction.

It will be apparent, that in order to ensure uniform distribution of the air throughout the entire filter-bed, it is imperative, that the tubes must be so adjusted that the upper edges of the saw cuts in said tubes are accurately located in a single horizontal plane. With the known construction referred to, this requires—the tubes being rigidly secured in the sleeves—a very accurate and level adjustment of the slabs in a common horizontal plane, which in view of the considerable weight of the slabs is very difficult to attain and requires much skill on the part of the operator.

Now according to my invention the plunge tubes are held in the respective sleeves by a lateral, resilient clamping force only, in such a manner, that they may be individually accurately adjusted in height by exerting an axial force on said tubes, particularly by screwing the nozzle into the sleeve. This enables an accurate, level adjustment of the upper edges of the saw cuts, even if the slabs themselves are not accurately positioned and that without necessitating the operator to enter the space below the slabs.

Further characteristic features and additional advantages of my invention will become apparent from the following description of a preferred embodiment thereof, reference being had to the accompanying drawings.

In said drawings,

Fig. 2 represents on an enlarged scale a vertical cross-section through portions of two adjoining slabs and one of the flush-nozzle assemblies.

Figure 1:
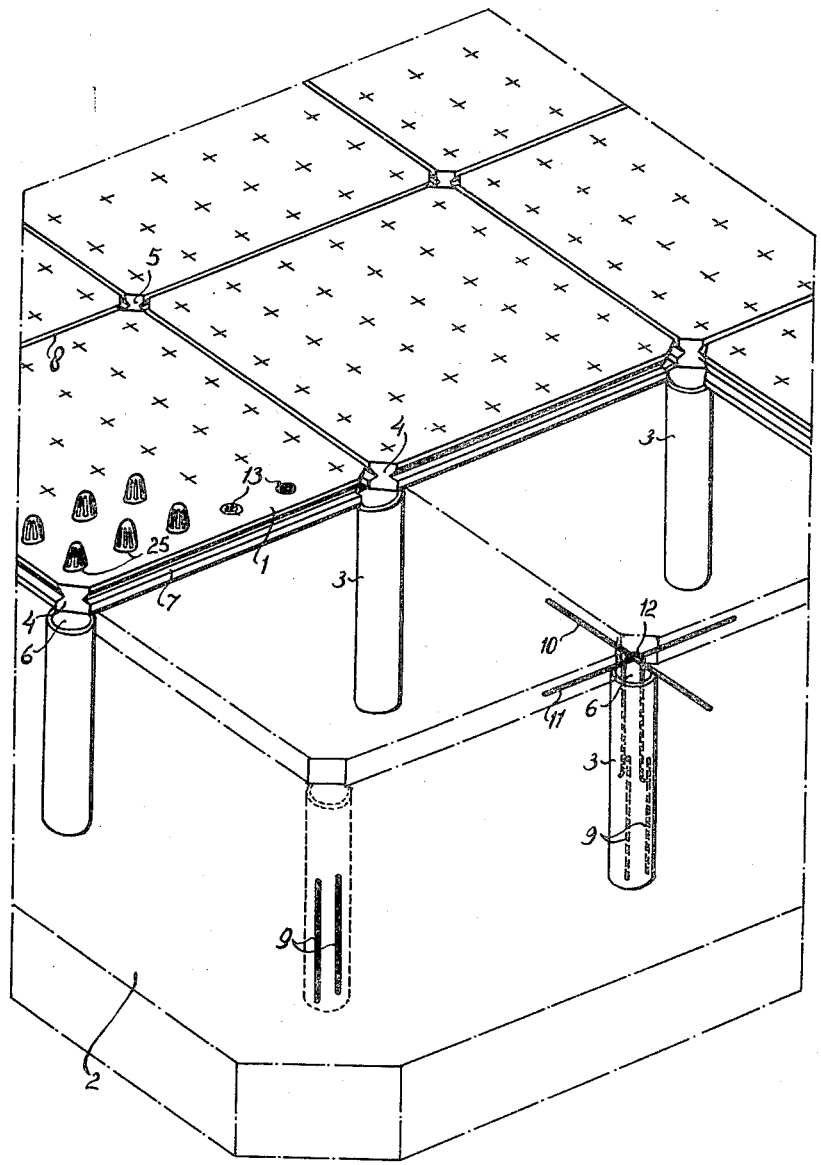
Fig. 1 represents a perspective view of a portion of my improved nozzle-floor, showing the manner in which the same is constructed.

As shown in these figures the nozzle-floor according to the invention, is constructed of prefabricated concrete slabs 1, which during the construction of the floor or bottom are arranged side by side in a horizontal plane a certain distance above the actual floor 2 of the filter. At the junction of their corners the slabs are supported by vertical tubular supports 3 of asbestos or the like substance, to which they are secured in a manner hereinafter to be described.

The slabs 1 are of reduced dimensions as compared with those of the known construction, having for instance a thickness, width and length of respectively 66, 66 and 5 cm., corresponding with a weight of circa 50 kg. so that they may be handled and laid in position by hand, thereby avoiding the use of hoisting gear.

At their corners such slabs are cut off as shown at 4 in Fig. 1 so that at their meeting points a square opening 5 is formed, symmetrically located above the bore 6 of the respective tubular support 3. The side faces of the slabs are grooved as shown in cross section in Fig. 1 so that the abutting side faces of two slabs define an enlarged central channel 7 closed at the bottom and opening into the upper face of the slabs by a narrow slot 8. Anchored in the floor 2 are pairs of metal rods 9 projecting from below in the bore 6 of the supports 3.

After the slabs are laid in position, pairs of rods 10, 11 are introduced through the slots 8 into the channels 7 so that the point of crossing of such rods is located above the centre of the respective bore 6 as shown in the figures. At each crossing a hairpin shaped rod 12 is hung on the rods 10, 11 extending downwardly into the bore 6 in overlapping condition with the upwardly projecting anchoring rods 9.

Thereafter, the whole is united into an integral structure, by introducing cement mortar through the slots 8 to completely fill the hollow supports 3 and the channels and slots in the side faces of the slabs, resulting in a strong, water and air tight monolith floor structure for the purpose specified.

The slabs 1 are provided during their fabrication with parallel rows of equidistant sleeves 13, which as appears from Fig. 2, comprise an upper portion 14, internally provided with screw threads 15 and a lower portion or extension 16 having ribs 16' which are encased in the concrete of the slab to positively lock the sleeve against rotation.

The extension 16 is formed with a conical inner wall 17 and at its lower end is provided with an internal ledge 18 defining a circular opening 19 through which is introduced from above, a tube 20 of non-corrosive material having a circular opening 21 formed therein at a certain distance from the lower end of the tube.

Surrounding the portion of the tube 20, located within the sleeve extension 16 there is a ring 22 of rubber or other elastic material which in free condition is preferably of circular cross section, fitting the annular space between the tube and the conical inner wall portion 17 of the sleeve.

The upper end of the tube 20 engages a tapered centering recess 23 formed in the lower face of the stem 24 of an inverted cup-shaped nozzle 25, such stem portion having screw threads 26 engaging the internal threads 15 of the upper portion of the sleeve. Radial slots 27 are formed in the body of the nozzle such slots being so narrow, say 0.7 mm., that normal filter material of a grain size of say 0.8 to 1.5 mm. may be used for the filterbed, without the necessity of surrounding the nozzles with layers of coarser material such as gravel.

In the centre of the cup-shaped nozzles there is further provided a downwardly directed cone 28 ensuring an even lateral distribution of air and water.

By screwing down the nozzle, the tube 20 may be axially displaced against the gradually increasing frictional resistance of the ring 22 to accurately adjust the opening 21 of the tube at the required height so that the openings of all tubes of the assembly are accurately located in one and the same horizontal plane as is necessary for ensuring a perfectly uniform distribution of the flushing mediums, the ledge 18 serving as a guarantee that under no circumstances the ring 22 will be forced out of the sleeve.

The provision of a circular entrance opening 21 in the tubes instead of the open ended saw cuts previously used, is of advantage in so far as such openings may be more easily made to size by punching or drilling, without the risk of internal stresses in the tube wall changing the dimension of the opening.

As according to the main feature of the invention, the plunge tubes are held in the sleeves by lateral circumferential clamping action only, so that they need not be provided with a flange at their upper end, as in the constructions hitherto known, it is possible to use therefore commercial tubes of standard size, which need only to cut to the required length and drilled or punched, thereby considerably reducing the costs of fabrication. This method of holding the tube by a lateral clamping pressure moreover permits the use of glass tubes which are considerably less expensive than tubes of copper or other anticorrosive metals of metal alloys. The particular shape chosen for the nozzle and associated sleeve enables their fabrication in mass production out of any suitable plastic.

It will be apparent that the invention is not limited to the particular embodiment described and shown in the accompanying drawings and that various modifications may be made therein within the scope of the appended claims.

What I claim is:

1. A nozzle structure for mounting on a false nozzle floor of a liquid purifying filter comprising a sleeve adapted to be fixed in a passage vertically extending through the false nozzle floor, one end portion of said sleeve being internally screw-threaded, the other end portion having a smooth downwardly tapering inner wall, a nozzle screwed into said screw-threaded end portion from above, a plunge tube slidably projecting into said other end portion of the sleeve from below axially engaged by the inner end of said nozzle screwed into said sleeve, and at least one ring of resiliently deformable material surrounding said plunge tube and wedged within the space between said tube and said tapering inner wall and having a circular cross-section when not compressed.

2. A nozzle structure for mounting on a false nozzle floor of a liquid purifying filter comprising a sleeve adapted to be fixed in a passage vertically extending through the false nozzle floor, one end portion of said sleeve being internally screw-threaded, the other end portion having a smooth downwardly tapering inner wall, a nozzle screwed into said screw-threaded end portion from above, the inner end of said nozzle having an inwardly tapering centering recess therein, a plunge tube slidably projecting into said other end portion of the sleeve from below engaged by said centering recess to center said plunger tube within said sleeve, and at least one ring of resiliently deformable material surrounding said plunge tube and wedged within the space between said tube and said tapering inner wall and having a circular cross-section when not compressed.

3. A nozzle structure according to claim 1; wherein said other end portion of the sleeve is formed with an inwardly directed radial flange at the lower edge thereof to define a circular opening through which said plunge tube closely extends so that said flange prevents inadvertent removal of said ring from said space between the tube and tapering wall.

4. A nozzle structure according to claim 2; wherein said other end portion of the sleeve is formed with an inwardly directed radial flange at the lower edge thereof to define a circular opening through which said plunge tube closely extends so that said flange prevents inadvertent removal of said ring from said space between the tube and tapering wall.

References Cited in the file of this patent

UNITED STATES PATENTS

| | | |
|---|---|---|
| 612,421 | Jewell | Oct. 18, 1898 |
| 653,160 | Williamson | July 3, 1900 |
| 791,213 | Roberts | May 30, 1905 |
| 1,031,043 | Conzelman | July 2, 1912 |
| 1,053,646 | Roberts | Feb. 18, 1913 |
| 1,097,999 | Turner | May 26, 1914 |
| 1,150,231 | Smith | Aug. 17, 1915 |
| 1,472,669 | Overbaugh | Oct. 30, 1923 |
| 1,503,421 | Innes | July 29, 1924 |
| 1,569,896 | Tanner | Jan. 19, 1926 |
| 2,011,937 | McKeage | Aug. 20, 1935 |
| 2,047,716 | Thompson | July 14, 1936 |
| 2,412,032 | Bill, Jr. | Dec. 3, 1946 |
| 2,537,659 | Eisner et al. | Jan. 9, 1951 |

FOREIGN PATENTS

| | | |
|---|---|---|
| 494,934 | Great Britain | Nov. 3, 1938 |